ered, while not intended as a definition, essential-

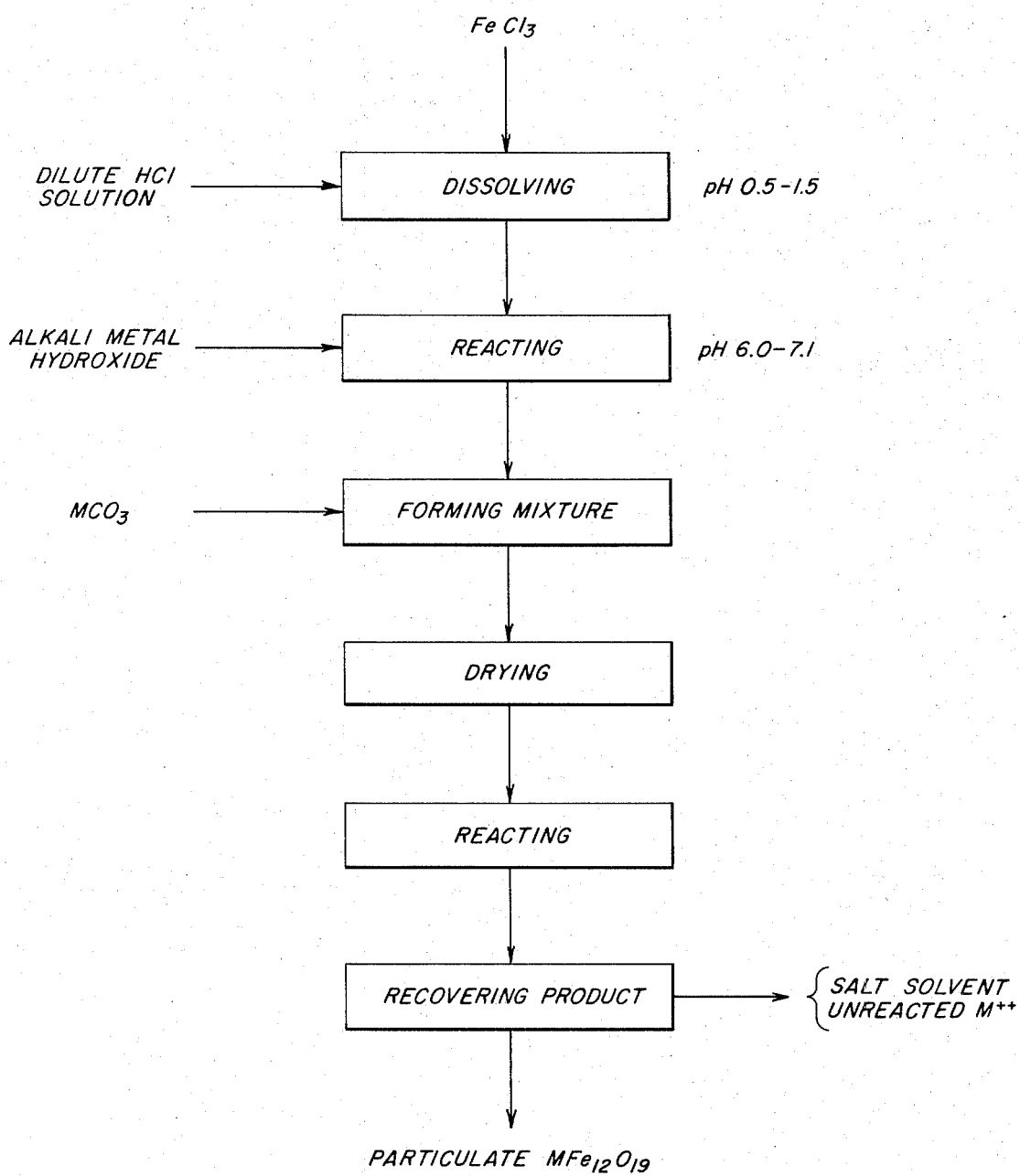

United States Patent Office 3,810,973
Patented May 14, 1974

3,810,973
METHOD OF PREPARING FERRITES
Ronald H. Arendt and Charles E. Vanburen, Schenectady, N.Y., assignors to General Electric Company
Filed Jan. 12, 1973, Ser. No. 323,084
Int. Cl. C01g 49/00
U.S. Cl. 423—594                5 Claims

ABSTRACT OF THE DISCLOSURE

A method of making a magnetoplumbite ferrite is provided wherein an aqueous solution of ferric chloride is reacted with an alkali metal hydroxide to form ferric oxide hydrate in a salt solution, and then an alkaline earth metal carbonate is added to the mixture. After drying, the ferric oxide and the alkaline earth metal carbonate are reacted in a molten salt solvent and the particulate ferrite is recovered.

IMPROVED METHOD OF PREPARING FERRITES

This invention relates to a method of making ferrite permanent magnet materials and in particular to materials which have a hexagonal lattice structure and are known as magnetoplumbite ferrites. The properties of these materials, such as $BaFe_{12}O_{19}$ and $SrFe_{12}O_{19}$, their crystal structure, and methods of preparation have been disclosed in publications.

In the production of ferrites in the form of micron and submicron-size powders, it has been the practice in the art to perform the synthesizing reactions at high temperature with the reagent oxides in the solid state. However, the solid state reactions require a considerable amount of time and do not always proceed substantially to completion. Consequently, separation and recovery of the desired product in good yield is often expensive. Moreover, particle size control is often difficult, the products of the solid state reaction tending to be too large.

Heretofore, it has been proposed to use a flux to promote the reaction between individual metal oxides at elevated temperatures in the solid state system. Borates, boric oxide, lead oxide and alkali metal fluorides and chlorides have been tested for this purpose with indifferent results. For instance, efforts to produce lithium ferrite ($LiFe_5O_8$) by reacting $Fe_2O_3$ with $Li_2CO_3$ dissolved in molten LiCl have encountered difficulties in the form of volatility of the chloride at the reaction temperature and a marked tendency toward hydrolysis and formation of $LiO_2$ which reacts with $LiFe_5O_8$ to produce the less desirable $LiFeO_2$. For these reasons, this chloride aproach has recently been dropped in favor of alkali metal sulfates which are non-volatile and inert toward ferrites.

The copending application of Arendt, Ser. No. 310,354, filed Nov. 29, 1972 describes a method of making a magnetoplumbite ferrite by reacting cation oxides of the ferrite in a solvent of NaCl-KCl in the presence of a source of water. The salt solvent provides a liquid or molten film in which the oxide components can dissolve and react to form the desired product. In addition, the system requires a source of water at elevated temperatures to improve the magnetic quality of the ferrite product. This requirement is met by using the hydrate $Fe_2O_3 \cdot xH_2O$. Unfortunately, a suitable ferric oxide hydrate is not commercially available and is uneconomical to prepare and separate on a large scale. Thus, while the ferrites obtained were of high quality, previously they could only be prepared in small amounts.

In accordance with the present invention, we have discovered an improved method of making a ferrite of the formula $MFe_{12}O_{19}$, wherein M is a divalent cation selected from the group consisting of barium and strontium. The method involves reacting an aqueous solution of ferric chloride with a sufficient amount of an alkali metal hydroxide to form ferric oxide hydrate in a salt solution, then adding an alkaline earth metal carbonate wherein the cation is barium or strontium, drying the mixture to remove the unbound water and reacting the ferric oxide hydrate and the alkaline earth metal carbonate in the molten salt solvent at a temperature of 1,000–1,050° C. The ferrite is then recovered by leaching out the salt solvent and the unreacted alkaline earth metal cation.

The accompanying drawing, which is a flow sheet of our novel process, while not intended as a definition, essentially illustrates the invention. The drawing shows the novel method of making ferrites by forming the ferric oxide hydrate in situ and then reacting the ferric oxide with the alkaline earth metal carbonate in the presence of the molten salt solvent. A full discussion is set forth herein below.

Ferric chloride is readily available as such or may be used in the form of one of its hydrates. It is initially dissolved in water, preferably deionized or distilled water. Thereafter dilute hydrochloric acid is added until the pH of the solution is about 0.5–1.5. This not only acidifies the solution, but also supplies additional chloride ions which may be required.

While forming the stoichiometric quantity of ferric oxide hydrate as an extremely fine precipitate, the salt solvent is formed, simultaneously, by the reaction of the alkali metal hydroxide with the acid chloride solution. Sodium chloride, potassium chloride or mixtures thereof provide a suitable salt solvent. We have found it preferable to use a 50–50 molar mixture of sodium chloride and potassium chloride. This step is one of the most important aspects of our invention, in that the simultaneous forming "in situ" of both the hydrated iron oxide and the desired salt solvent eliminates the necessity of separating them from solution. The pH of the resulting solution should be in the range of 6.0–7.1, with the preferred pH being about 6.7.

To the hydrated ferric oxide in the aqueous salt solution is then added an alkaline earth metal cation compound which is capable of decomposing to the oxide at the reaction temperature. The preferred compounds are the alkaline earth metal carbonates having the formula $MCO_3$, wherein M is barium or strontium, since these are the desired cations in the ferrites. A ten percent excess of the stoichiometric amount is recommended. While less economical, the nitrates and hydroxides may also be used. The mixture is then blended to form a homogeneous dispersion.

Thereafter the dispersion is dried to remove the unbound water using conventional drying techniques. The preferred method is spray drying.

In a preferred practice, the ratio of the salts solvent to the reactants of the mixture will be of the order of about seven parts to three parts by weight, respectively. Thus, at any given time in the process, only a proportion of the entire solvent-reactants mixture is in liquid form and yet the reactions between the reactants proceed at acceptable rates.

The necessity for a source of water in the system at the reaction temperatures between the ferric oxide and the alkaline earth metal carbonate is an important feature of our process. The water acts to prevent or block any tendency for the iron of the ferrite to be reduced to any significant extent to the ferrous state and to promote the solution of the $Fe_2O_3$ in the molten salt solvent. The amount of such water is apparently comparatively small, the requirements of the process being met through the use of the water source providing only a mol equivalent for each mol of the iron constituent in the desired ferrite compound. This requirement is met by the water of hydration in the ferric oxide hydrate. We have found that in the absence of a source of such water, the quality of the ferrite product obtained in terms of desired magnetic characteristics is invariably inferior to that of the product prepared in the presence of the high-temperature water source, which has a much lower ferrous iron content.

The minimum temperature to which the reaction mixture is heated will depend upon the nature of the salt solvent, that is, its melting-point temperature, it being essential that the solvent be in the liquid or molten phase. In general the operating temperature during the period that reactions of this process are going on will be 1,000° C. or higher. Temperatures somewhat below 1,000° C. level lead to smaller yields of the desired inorganic compound reaction product because of incomplete decomposition of cation oxide sources. Higher temperatures operation, on the other hand, assures complete reaction in reasonably short periods of time such as of the order of 30 minutes in the case of the 1,000° C. to 1,050° C. operating temperature. The time-temperature relationship will be understood by those skilled in the art to vary inversely, the higher temperatures requiring shorter periods of time for the same reaction efficiency and product yield. The upper limit of temperature as a practical matter will be about 1,100° C. Further, there is no upper limit of time at operating temperature other than the practical or economic limit that the operator wishes to impose. Prolonged heating at operating temperature, however, can lead to reduction in the quality of the ultimate product because of the loss of protection against reduction of the iron component to the ferrous state as water is exhausted from the reaction mixture or as the molten salt solvent evaporates from the mixture.

When the heating period is concluded, the reaction mixture may be furnace-cooled, air-cooled or even water-quenched to room temperature. Separation of the desired product from the remaining constituents of the reaction mixture, including chloride solvent and unreacted alkaline earth metal compounds, can then be carried out. Preferably, the reaction mixture is subjected after air-cooling to contact with water to leach out and remove the water-soluble chloride solvent. In the case where the process results in substantially complete reaction of the reactants, this removal of water-soluble constituents will leave the water-insoluble product ferrite in substantially pure form uncontaminated by other materials physically or chemically associated with it. It has been found that because of the fact that the reactions take place in the liquid or molten medium, the reaction product in each instance is a precipitate. Actually, this precipitate is in the form of crystallites of the desired inorganic compound, crystallization apparently occurring more or less continuously as the reactants are dissolved and reacted with each other in the fused salt solvent which becomes a saturated or even a supersaturated solution of the reaction product as the process proceeds, or as the reaction mixture is cooled.

The magnetoplumbite ferrite products prepared by our process are in the form of a powder of regular hexagonal platelet crystallites. These crystallites are submicron in size, being less than one-half micron thick and having a basal plane transverse major dimension not greater than about 1.5 microns. While the physical dimensions are similar, there are variations in magnetic properties which are dependent on the composition. Thus, in the case of $BaFe_{12}O_{19}$ the crystallites have characteristically a saturation magnetization of about 72 electromagnetic units per gram (abbreviated as emu.g.$^{-1}$) and an intrinsic coercive force ($H^c{}_i$) from about 4,800 up to 5,400 oersteds at 298° K. and in the case of $SrFe_{12}O_{19}$ the crystallites have a saturation magnetization of about 74 emu.g.$^{-1}$ and an intrinsic coercive force from about 5,700 up to 6,100 oersteds at 298° K.

Our invention is further illustrated by the following examples:

EXAMPLE I

A plumbomagneto ferrite was prepared from the following formulation:

| Ingredient: | | Weight |
|---|---|---|
| $FeCl_3 \cdot 6H_2O$ | g | 2400.0 |
| $SrCO_3$ | g | 118.56 |
| HCl (37 wt. percent sol'n.) | ml | 5.0 |

The ferric chloride and the hydrochloric acid were dissolved in 9 liters of deionized water and filtered to remove insoluble material. To this solution was added a concentrated 50 w/o NaOH–50 w/o KOH solution to give a mixture having a pH of 7.0. The solution volume was increased to 12.0 liters with additional deionized water. The mixture was digested at 90° C. for two hours and then allowed to cool to room temperature. The pH of the mixture was then adjusted to 6.70 using a pH electrode.

The strontium carbonate powder was then blended into the mixture of $Fe_2O_3 \cdot xH_2O$ in the mixed NaCl-KCl salt solution. The resulting mixture was then spray dried to a fluffy powder.

The molten salt synthesis was performed by heating the dried powder mixture in a platinum crucible at 1,025° C. in an air atmosphere for 60 minutes.

Thereafter the reaction mixture was cooled and the salt was leached out with water to yield the mono-dispersed $SrFe_{12}O_{19}$ product. The crystallite size of the ferrite was a maximum of 1.5 microns. The saturation magnetization at 298° K. of the product was $\cong$ 74 emu.g.$^{-1}$ and the intrinsic coercive field ($H_{ci}$) was 5,970 oersteds.

EXAMPLE II

Following the procedure of Example I, a plumbomagneto ferrite was prepared from the following formulation:

| Ingredient: | | Weight |
|---|---|---|
| $FeCl_3 \cdot 6H_2O$ | g | 700.0 |
| $BaCO_3$ | g | 46.20 |
| HCl (37 wt. percent sol'n.) | ml | 2 |

The ferric chloride and the hydrochloric acid were added to deionized water. To this solution was added a 50% by weight solution of NaOH and the total mixture volume adjusted to 3.5 liters with deionized water. The mixture was digested, cooled and the pH adjusted to 6.70.

The barium carbonate powder was then blended into the mixture of $Fe_2O_3 \cdot xH_2O$ in the NaCl salt solution. The resulting mixture was spray dried to a fluffy powder.

The molten salt synthesis was performed by heating the dried powder mixture in a platinum crucible at 1,025° C. in an air atmosphere for 60 minutes.

After cooling and leaching, a powder of $BaFe_{12}O_{19}$ having a maximum particle size of 1.5 microns was recovered. The product had a saturation magnetization at 298° K. of 72 emu.g.$^{-1}$ and an intrinsic coercive field of 5,370 oersteds.

EXAMPLE III

In order to illustrate the improvement provided by the present invention over the process in the above-mentioned Arendt application, a sample of a ferrite was prepared using a 100 gram mixture of 1.5 micron size powders of the following formulation:

| Ingredient: | Weight, g. |
|---|---|
| $BaCO_3$ | 3 |
| $Fe_2O_3 \cdot xH_2O$ | 17 |
| NaCl | 35.14 |
| KCl | 44.86 |

The substantially uniform mixture was heated to 1,000° C. for 60 minutes and then air cooled to room temperature. The salt solvent was leached out with distilled water to yield a fine powder of the $BaFe_{12}O_{19}$.

The product had a saturation magnetization at 298° K. of ≅72 emug.$^{-1}$ and an intrinsic coercive field of 3,200 oersted. A comparison of this data with that of Example II shows that a considerable improvement in the intrinsic coercive field is obtained by the process of the present invention.

It will be appreciated that the invention is not limited to the specific details shown in the examples and illustrations and that various modifications may be made within the ordinary skill in the art without departing from the spirit and scope of the invention.

We claim:
1. A method of making a ferrite having the formula $MFe_{12}O_{19}$ wherein M is an alkaline earth metal cation selected from the group consisting of barium and strontium comprising the steps of
   (a) reacting an aqueous solution of ferric chloride having a pH of about 0.5 to 1.5 with a sufficient amount of an alkali metal hydroxide selected from the group consisting of sodium hydroxide, potassium hydroxide and mixtures thereof to form a first mixture of a ferric oxide hydrate in an aqueous solution having a pH in the range of 6.0 to 7.1 of a salt solvent,
   (b) then adding to the first mixture an excess amount of an alkaline earth metal compound which is capable of decomposing to the corresponding oxide at the reaction temperature, wherein the alkaline metal cation is defined as hereinabove, to form a second mixture,
   (c) drying the second mixture to remove the unbound water,
   (d) reacting the ferric oxide hydrate and the alkaline earth metal compound in the salt solvent at a temperature of about 1,000–1,050° C., and
   (e) recovering the particulate ferrite by leaching out the salt solvent and the unreacted alkaline earth metal carbonate.

2. The method of claim 1, wherein the alkaline earth metal compound is a carbonate having the formula $MCO_3$ wherein M is as defined hereinabove.

3. The method of claim 2, wherein the ratio of the salt solvent to the reactants of the second mixture is about seven parts to three parts by weight respectively.

4. The method of claim 2, wherein the ferrite is in the form of crystallites of $BaFe_{12}O_{19}$, the alkaline earth metal compound is barium carbonate and said crystallites are characterized by a saturation magnetization of about 72 emug.$^{-1}$ and an intrinsic coercive force from about 4,800 up to 5,400 oersteds at 298° K.

5. The method of claim 2, wherein the ferrite is in the form of crystallites of $SrFe_{12}O_{19}$, the alkaline earth metal compound is strontium carbonate and said crystallites are characterized by a saturation magnetization of about 74 emug.$^{-1}$ and an intrinsic coercive force from about 5,700 up to 6,100 oersteds at 298° K.

References Cited
UNITED STATES PATENTS

| | | | |
|---|---|---|---|
| 2,370,443 | 2/1945 | Biefeld | 423—594 X |
| 2,904,395 | 9/1959 | Downs et al. | 423—594 |
| 3,113,109 | 12/1963 | Brixner | 423—594 |
| 3,115,469 | 12/1963 | Hamilton | 423—594 |

FOREIGN PATENTS

| | | | |
|---|---|---|---|
| 11,063 | 3/1965 | Japan | 423—594 |

HERBERT T. CARTER, Primary Examiner